Feb. 2, 1965 C. W. PARMENTER ETAL 3,168,684
NON-INTERCHANGEABLE MEANS FOR CIRCUIT BREAKER PANELBOARDS
Filed Dec. 13, 1961 2 Sheets-Sheet 1
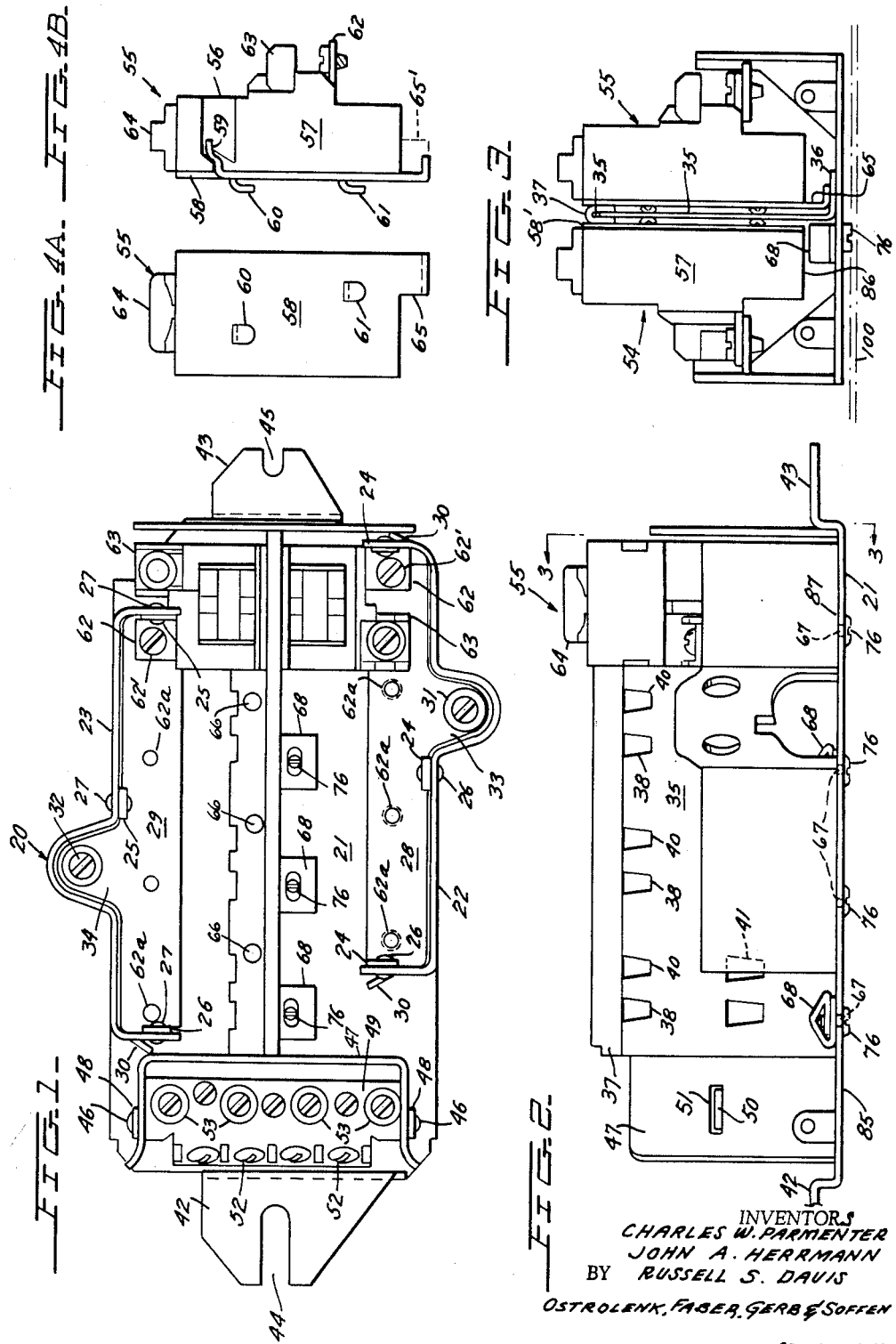
INVENTORS
CHARLES W. PARMENTER
JOHN A. HERRMANN
BY RUSSELL S. DAVIS
OSTROLENK, FABER, GERB & SOFFEN
ATTORNEYS

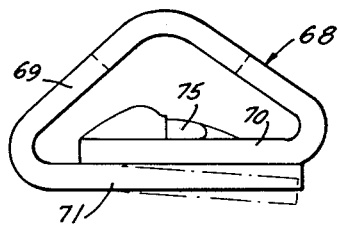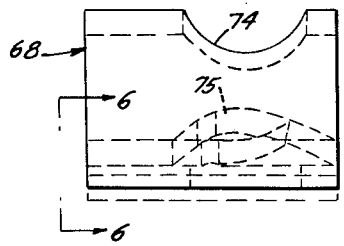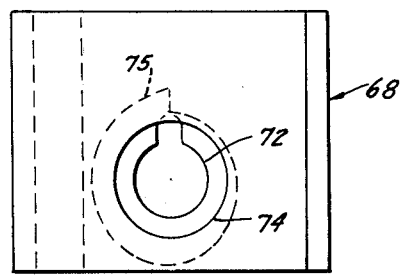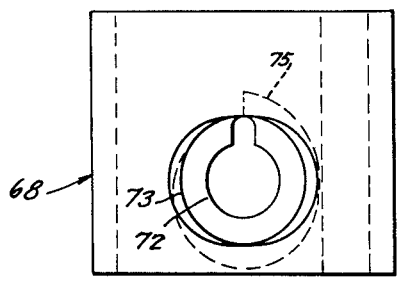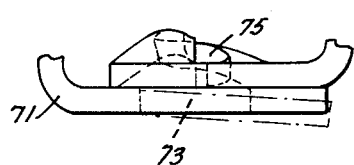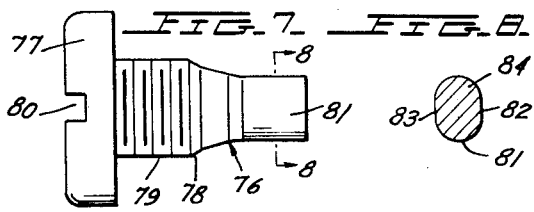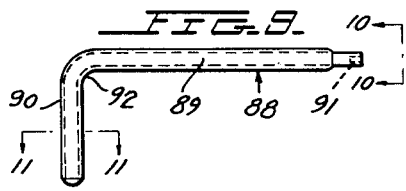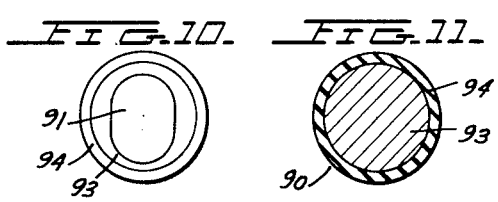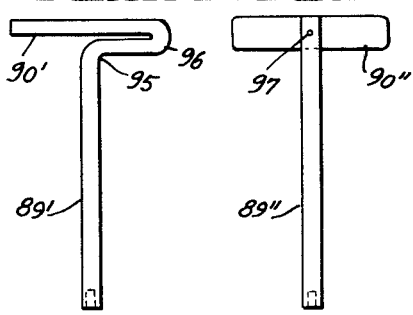

United States Patent Office 3,168,684
Patented Feb. 2, 1965

3,168,684
NON-INTERCHANGEABLE MEANS FOR CIRCUIT BREAKER PANELBOARDS
Charles W. Parmenter, East Detroit, John A. Herrmann, Grosse Pointe Farms, and Russell S. Davis, Detroit, Mich., assignors to I-T-E Circuit Breaker Company, Philadelphia, Pa., a corporation of Pennsylvania
Filed Dec. 13, 1961, Ser. No. 159,078
13 Claims. (Cl. 317—119)

Our invention relates to a circuit breaker panelboard defeater system and more particularly to a novel blocking means for preventing the replacement, by an unskilled person, of a circuit breaker of low current rating with a circuit breaker of higher current rating.

In a great variety of power distribution, installations, particularly for home and industry, the connections from the main circuit to the individual branch circuits take place at a central panelboard. The various branch circuits will oftentimes have different current requirements and each of the branch circuits is usually protected by an individual circuit breaker of appropriate corresponding current rating mounted in the panelboard. To insure the adequate protection of the branch circuits it must be impossible to install a circuit breaker in a panelboard location of higher rated current than the branch circuit connected to the panelboard at that location.

Because of mass production techniques wherein the greatest economies are effected by utilizing common parts wherever possible, the casings of circuit breakers having low current ratings, say 15–20 amperes, are the same size as the casings of circuit breakers having high current ratings, say 30–60 amperes. Thus, all branch circuit locations in the panelboard are of the same size since it is not possible to accurately predict the current requirements of the branch circuit which ultimately will be connected to the panelboard.

This leads to the undesirable and dangerous condition which permits an unskilled person to readily replace a circuit breaker of low current rating with one of higher current rating. When this is done the branch circuit is not adequately protected. That is, either the branch circuit wiring may become overloaded, causing over heating thereof which rapidly accelerates insulation deterioration, or the branch circuit connected load device may burn out when overloaded.

The instant invention solves the above noted problem by providing a panelboard, with an important removable blocking means, which is adapted to receive circuit breakers of a compatible construction. Each branch circuit location of the panelboard is provided with an opening adapted to receive the blocking means which is an improvement of a blocking means for similar purpose described in copending U.S. application Serial No. 806,959 filed April 16, 1959, and now abandoned, entitled "Non-Interchangeable Means for Circuit Breaker Panelboard" in the name of George H. Farnsworth et al., and assigned to the assignee of the instant invention. The blocking means set forth in the above noted copending application Serial No. 806,959 can only be removed from the back side of the panelboard. Since the back side of the panelboard is adjacent to the back wall of the panelboard enclosure, the removal of that blocking means requires the panelboard interior to be detached from its enclosure; which is an extremely inconvenient procedure.

Our invention, while still making it extremely inconvenient for an unauthorized or unskilled person to alter the panelboard so that a location for low current circuit breakers may receive higher current circuit breakers, will permit a properly authorized person to make such an alteration in a relatively simple manner not requiring the panelboard interior to be detached from its enclosure. Such removal by a properly authorized person is accomplished by a special tool which can remove the blocking means from the front side of the panelboard. The blocking means is so designed that ordinarily available tools, such as screwdriver, gas pliers, needlenose pliers or a hammer are incapable of removing it from the front side of the panelboard.

The improved blocking means of our invention includes a rigid obstructing member and a special attaching member for securably attaching the obstructing member to the panelboard at those locations which are to be made incapable of accepting a higher current circuit breaker. The attaching member is inserted in the panelboard from the rear and has a forward portion extending through the panelboard and in front thereof. Its forward projection is preferably completely contained in the volume defined by the obstructing member, but is accessible to a special tool from in front of the panelboard. Only the special tool can so engage the attaching member and disengage it from the obstructing member, permitting the obstructing member to be removed from the panelboard.

In a preferred embodiment of our invention the obstructing member is triangular shaped and has openings through its base and apex. The attaching member is a specially constructed screw having a right-hand threaded shaft for screwing the base of the triangular obstructing member to the panelboard. The triangle base opening is internally threaded to be engaged by the attaching screw. The attaching screw is inserted from the rear of the panelboard and will have its head disposed at that surface. The shaft of the attaching screw extends forward of the front of the panelboard, and the triangle base is attached thereto.

The forwardly extending portion of the attaching screw is completely contained within the triangular volume defined by the obstructing member. Also, the head of the screw is larger than the panelboard opening, preventing the screw from being pulled through the panelboard opening from the front of the panelboard.

The forward end of the attaching screw shaft is unthreaded and formed to a particular shape.

A special tool, of the socket wrench variety, having a similar particularly shaped recess at its operable end is provided. The apex opening of the triangular obstructing member is of sufficient size to admit the shaft of this special tool to the attaching screw forward end allowing its recess to physically mate with the specially shaped end of the attaching screw. This opening, while permitting the special tool to enter, is sufficiently small to prevent ordinary tools from entering and engaging the attaching member forward end. The special tool is then rotated clockwise to remove the attaching screw from the triangle base, permitting the removal of that obstructing memmber from the panelboard. The attaching screw may then be pushed through the panelboard opening permitting it to fall to the bottom of the area between the panelboard interior and its enclosure.

It is a particularly advantageous feature of our invention that the attaching member is turned clockwise from the front of the panelboard to loosen. As is well known, screws are normally turned in a counter-clockwise direction to loosen. Thus, should an unauthorized individual, unfamiliar with the defeater means of our invention, improvise a tool to engage the attaching screw forward end, he will most likely attempt to loosen it by turning it counter-clockwise. Failing to so loosen the screw he is apt to be discouraged from trying further.

In using a screw which is turned clockwise to loosen, it is quite desirable from a manufacturing cost aspect, to use a right-hand threaded screw. Such screws are readily and relatively inexpensively obtainable. Using a left-hand threaded screw, to incorporate this feature would be considerably more costly.

In the embodiment chosen to illustrate the application of the instant invention the blocking means is disposed adjacent to the circuit breaker mounting member at the circuit breaker position with it being understood that other types of panelboard using our invention could have the blocking means at another location. It is also understood that although the embodiment shows a single blocking means associated with each particular circuit breaker position, additional blocking means may be included at the circuit breaker locations to provide for three or more steps of interchangeability; or a series of successively larger single blocking means may provide for such multiple step interchangeability. The circuit breaker of higher current rating is constructed with either the casing or cover having a downwardly projecting portion which is positioned to engage the blocking means and thereby prevent the circuit breaker of higher current rating from being mounted at a circuit location having a blocking means installed thereat. Should three or more steps of interchangeability be desired, successively higher circuit breakers will have additional projections, or correspondingly larger projections.

Circuit breakers of low current rating which are constructed for mounting to the same panelboard do not have the downwardly projecting portion hereinbefore mentioned. Thus, the blocking means will not interfere with the mounting of a low current rating circuit breaker.

Accordingly, a primary object of the instant invention is to provide a novel removable blocking means to prevent the replacement of a circuit breaker of low current rating by a circuit breaker of higher current rating through inadvertence or lack of understanding on the part of the person making the replacement, while permitting such interchangeability to be readily accomplished by a properly authorized person.

Another object is to provide a novel obstructing member and attaching member combination which comprises a blocking means to prevent the interchangeability of a higher rated circuit breaker for one of low current rating by an unauthorized person, but may be readily removed by an authorized person for such interchangeability.

Still another object is to provide a novel obstructing member and attaching member combination which comprises a blocking means which is installed from the back of the panelboard to prevent unauthorized circuit breaker interchangeability, but may be readily removed from the front of the panelboard by an authorized person, to permit such interchangeability.

A further object is to provide a novel obstructing member and attaching member combination for preventing circuit breaker interchangeability in which a relatively unaccessible defeater means of the attaching member is enclosed within the obstructing member volume.

A still further object is to provide a novel obstructing member and attaching member combination for circuit breaker interchangeability which can be removed from the front of the panelboard by the use of a special tool to turn the attaching member in a clockwise direction.

These, as well as other objects of the instant invention, shall readily become apparent after reading the following description of the accompanying drawings in which:

FIGURE 1 is a plan view of a panelboard chosen to illustrate the novel blocking means of the instant invention.

FIGURE 2 is a side elevation of the panelboard of FIGURE 1.

FIGURE 3 is a cross-section taken through line 3—3 of FIGURE 2 looking in the direction of the arrows.

FIGURE 4A and 4B are an elevation and an end view, respectively, of a circuit breaker of high current rating mountable to the panelboard of FIGURE 1 and constructed in accordance with the teachings of the instant invention.

FIGURES 5a, 5b, 5c, and 5d are a side elevation, plan, end and bottom view, respectively of the triangular obstructing member.

FIGURE 6 is a cross-section taken through line 6—6 of FIGURE 5c looking in the direction of the arrows.

FIGURE 7 is an elevation view of the threaded attaching member compatible with obstructing member of FIGURES 5 and 6.

FIGURE 8 is a cross-section taken through line 8—8 of FIGURE 7 looking in the direction of the arrows.

FIGURE 9 is a side elevation view of a special tool compatible to the threaded attaching member of FIGURE 7.

FIGURE 10 is a partial end section of the special tool as indicated by the line 10—10 of FIGURE 9, and looking in the direction of the arrows.

FIGURE 11 is a cross-section taken through line 11—11 of FIGURE 9 looking in the direction of the arrows.

FIGURES 12, 13, 14, and 15 are elevations of other special tool configurations.

Referring now to FIGURES 1-3, panelboard 20 includes a base plate 21 to which the other panelboard members are mechanically secured either directly or indirectly. Offset extensions 42, 43 are provided at opposite ends of base plate 21. Each extension 42, 43 includes an open ended slot 44, 45, respectively, which receives a fastening means (not shown) for securing panelboard 20 to the back wall of its enclosure 100.

Rivets 26 secure insulating side member 22 to base plate 21 at three tabs 24 and in the same manner rivets 27 secure insulating side member 23 to base plate 21 at tabs 25. Parallel buses 28, 29 are secured to side members 22, 23, respectively, by having the reduced ends thereof entered into slots (not shown) in member 22, 23 formed by the lancing thereof to form flaps 30. Cable connectors 31, 32 are secured to bus bars 28, 29, respectively at outward projection 33, 34 respectively, thereof which are disposed in outwardly curved portions of side members 22, 23.

Circuit breaker mounting member 35, centered between buses 28, 29 and extending parallel thereto, is welded or otherwise secured to base plate 21 along foot 36 at the lower end of mounting member 35. An elongated inverted U-shaped strip 37 caps the top edge of mounting member 35 which is provided with windows 38-41 for position locating and securing circuit breakers, as will be hereinafter explained.

Rivets 46 secure U-shaped end insulating member 47 to ears 48 which project upwardly from base plate 21. Neutral conducting member 49 extends between the arms of insulating member 47 and is secured thereto by means of reduced extensions 50 at each end of member 49 which extend into openings 51 in the arms of insulating member 47. Screws 52 and connectors 53 secured to conducting member 49 form a plurality of neutral terminals for the branch circuits.

Circuit breakers 54 and 55 are of the type described in detail in the E. T. Plate U.S. Patent No. 2,385,727, assigned to the assignee of the instant invention. Circuit breaker 54 is of low current rating, say 15 to 20 amperes while circuit breaker 55 is of high current rating, say from 30 to 50 amperes. That is, the automatic trip unit is set to operate in the range of 15 to 20 amperes in the case of circuit breaker 54 while the trip unit of circuit breaker 55 is set to operate in the range of 30 to 50 amperes.

Referring in addition to FIGURES 4A and 4B, circuit breaker 55 includes a housing 56 formed by a molded casing 57 and a cover 58 constructed of sheet metal and secured to casing 57 by tabs 59. Cover 58 is provided with a pair of offset hooks 60, 61 which are entered into two of the openings 38-41 depending upon which side of mounting member 35 circuit breaker 55 is mounted. In the illustration of FIGURES 1–3 hook 60 is entered into opening 38 and hook 61 is entered into opening 41.

Circuit breaker 55 further includes a line terminal 62 and a load terminal 63 raised above and offset from line terminal 62. Screw 62′ extending through a clearance hole in line terminal 62 is received by one of threaded apertures 62a in bus bars 28, 29 thereby electrically connecting terminal 62 to one of the bus bars 28, 29. Operating member 64 extends through an opening in the top of casing 57 and provides means whereby the co-operating contacts (not shown) of the circuit breaker are manually operated in and out of engagement by merely depressing operating member 64. The only differences between the external constructions of circuit breakers 54 and 55 is that the cover 58 of the high current rating circuit breaker 55 is provided with an L-shaped extension 65 not found in the cover 58′ of low current rating circuit breaker 54.

There are four sets of openings 38–41 or circuit breaker position locating means in mounting member 35 which define locations for the mounting of four circuit breakers on each side of mounting member 35 so that a total of eight circuit breakers may be mounted to panelboard 20. Base plate 21 is provided with openings 66 adjacent to mounting member 35 on the side thereof facing bus bar 29, one opening 66 for each circuit breaker location on that side of mounting member 35. Since foot 36 extends to that side of mounting member 35, the foot 36 is also provided with apertures which are in alignment with aperture 66. Similarly, base plate 21 is provided with four apertures 67 positioned adjacent to mounting member 35 on the side thereof opposite bus bar 28, one aperture 67 for each circuit breaker location on that side mounting member 35.

The base plate openings 66 and 67 are each adapted to receive the blocking means of our invention. Referring now in addition to FIGURES 5–8, the blocking means comprises the removable triangular circuit breaker obstructing member 68 and the attaching member 76. Obstructing member 68 is integrally formed of a strip of rigid material 69.

The material of the strip is preferably steel which is case hardened for additional toughness. The ends of the strip 69 are preferably overlapped for increased rigidity, to form an inner base layer 70 and an outer base layer 71. These layers contain obstructing member openings 72 and 73. Either or both of these openings may be threaded. In the example chosen to illustrate our invention opening 72 contains internal thread 75, as best shown in FIGURE 6. This thread is of a size to engage the attaching member 76 as will be set forth below. This thread is advantageously right-handed and preferably of the sheet metal variety. The apex of member 68 contains another obstructing member opening 74, the purpose of which is fully set forth below.

Attaching member 76 is essentially a modified conventional type screw containing a head 77 and a shaft 78. Shaft 78 contains a right hand threaded portion 79 of the same thread type and size as 75 permitting members 76 and 68 to be threadedly engaged. The threaded shaft 79 is significantly longer than the combined depths of base plate 21 and obstructing member base layers 70 and 71, to ensure good threadable engagement when obstructing member 68 is attached to the base plate 21. However, the shaft 79 is short enough to be contained within the volume defined by triangular member 68. The head 77 of the attaching member contains a transverse slot 80 of appropriate dimensions to be engageable by an ordinary screwdriver. The most forwardly projecting portion 81 of attaching member shaft 78 is unthreaded and formed to a particular shape. In the embodiment chosen to illustrate the instant invention, opposite surfaces 82 and 83 of the portion 81 are flattened to form a generally rectangularly shaped cross-section 84 as shown in FIGURE 8. Our invention is by no means limited to the forming of such a generally rectangular cross-section 84, but includes the forming of any other cross-section which will serve to prevent the engagement of portion 81 by an ordinary tool, as set forth below. Cross-section 84 is however, illustrated as a preferred embodiment because of the relatively low manufacturing cost of forming such a cross-section.

Obstructing member 68 is mounted to base plate 21 by inserting the shaft 78 of attaching member 76 through one of the openings 66, 67 from the back side 85 of base plate 21. The attaching member is then inserted through obstructing member opening 73 leading to obstructing member opening 72, where shaft portion 79 is threadedly engaged with obstructing member thread 75. Inserting a screw driver in slot 80 and turning it clockwise will tighten members 68 and 76, serving to securably attach the blocking means of our invention to the panelboard. Head 77 is larger than openings 66, 67, preventing it from passing therethrough. When a circuit breaker location is provided with the blocking means comprising obstructing member 68 at attaching member 76, only a circuit breaker of low current rating 54 can be mounted at this location. This is clearly seen in FIGURE 3 wherein the circuit breaker of low current rating 54 is mounted on the left side of mounting member 35. In this position the bottom 86 of circuit breaker case 57 as well as the bottom of cover 58′ abut the top of obstructing member 68. If an attempt is made to mount the circuit breaker of high current rating 55 at this location, cover extension 65 will be engaged by obstructing member 68 and hooks 60, 61 cannot be entered into the appropriate mounting aperture of mounting members 35. Thus, it is seen that a circuit breaker of high current rating 55 cannot be mounted at a location in panelboard 20 which is provided with an obstructing member 68. As an alternative to the extension 65 of cover 58 the lower end of casing 56 may be extended as illustrated in the dotted area 65′ of FIGURE 4B.

It is obvious that the blocking means of my invention may also be removed in the same manner from in back of base plate 21 by a screwdriver being turned counter-clockwise. However, with panelboard 20 mounted within its enclosure 100 the head 77 of attaching member 76 rests against the back wall of the enclosure 100, making it quite inconvenient to gain access to the screwdriver slot 80.

Our invention permits the removal of the blocking means from the front surface 87 of the base plate 21 by means of a special tool of the type illustrated in FIGURES 9 and 10. Referring to those figures, the special tool 88 is seen to be of the socket wrench variety. It comprises an elongated rod 89 having a handle 90 at its upper end and a recessed slot 91 at its lower end. The cross-section of the recessed slot 91 is of the same generally rectangular shape as cross-section 84 of attaching member 76. However, the dimensions of cross-section 91 are slightly in excess of the dimensions of 84 to permit a snug fit of projecting portion 81 in recess 91. Also the depth of recess 91 in rod 89 is sufficient to permit a substantial portion of the length of projection 81 to enter slot 91, to ensure good physical contact between these two members. Handle 90 comprises a short rod 91 integrally connected to the upper end of elongated rod 89 by a right angle bend 92. To reduce manufacturing costs, tool 88 is preferably formed of a rod of circular cross-section 93, as shown in FIGURE 11. The handle portion 90 of the rod is preferably coated with an electrical insulating material 94 to provide a safety factor and eliminate the hazard from electrical shock that could result if the operator attempted to use the tool with the panel electrically energized. The material of the rod is preferably steel treated for additional hardness. Insulating coating 94 may extend down a portion of elongated rod 89 to simplify the manufacturing process of applying the coating.

The apex obstructing member opening 74 is of sufficient diameter to permit the entry of cross-section 93. Thus, to remove obstructing member 68 from in front 87 of the base plate 21 the recess 91 of the special tool 88 engages the shaped portion 81 of attaching member 76. The handle 90 is rotated clockwise to unscrew the threadedly engaged members 68 and 76 until the mating threads 75 and 79 are disengaged. Circuit breaker obstructing member 68 is then removed and attaching member 76 may be pushed through its base plate opening, 66 or 67, permitting it to fall to the bottom of the area between the back surface 85 of the base plate 21 and its enclosure 100. The screw may safely remain here since it will not come into electrical contact with any of the system members when so disposed.

Obstructing member apex opening 74 is of sufficiently small diameter that, while it permits the entry of the special tool 88, it will prevent an ordinary tool from engaging the forward portion 81 of attaching member 76 contained therein.

FIGURES 12-15 illustrate other special tool configurations which may be employed in my invention. However, the FIGURE 9 configuration is preferred in that it represents low manufacturing costs. All of the tools of FIGURES 12-15 are similarly of the socket wrench variety having an elongated rod 89', 89'', 89''', 89'''' and a handle 90', 90'', 90''', 90'''', respectively. Recessed slots 91', 91'', 91''', and 91'''' are analogous to recessed slot 91 and of same cross-section. The various tools differ in the manner in which the handles are attached to the elongated rods. The tool of FIGURE 12 is integrally formed with the handle 90' and elongated rod 89' being joned by two right angle bends 95 and 96. In FIGURE 13, the upper portion of rod 89' is threaded to mate with a threaded aperture of handle 90. An insert 97 prevents relative rotation between members 89'' and 90''. In FIGURE 14 the upper end of rod 89''' has an opening through which the separate rod member 90''' is inserted. As with tool 88, each of these last mentioned tools will preferably have their handles coated with electrical insulating material 94. The tool of FIGURE 15 more closely resembles the conventional socket wrench with rod 89'''' being inserted in wooden handle 90''''.

Although we have here described a preferred embodiment of our novel invention, many variations and modifications will now be apparent to those skilled in the art. For example, the number of steps of interchangeability may be increased by either locating additional blocking means at a single circuit breaker position or varying the dimensions of the single blocking means. Correspondingly, additional projections would be added to successively higher rated circuit breakers, or the single projection would be increased in size. We therefore prefer to be limited, not by the specific disclosure herein, but only by the appending claims.

The embodiments of the invention in which an exclusive privilege or property is claimed are defined as follows:

1. A circuit breaker defeater system comprising a panelboard to cooperate with a plurality of circuit breakers, a first of said circuit breakers having a higher current rating than a second of said circuit breakers, said panelboard including a forward surface and a rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening said blocking means will prevent said first circuit breaker from being securely attached to said panelboard forward surface at a location defined by said first locating means, said blocking means including a circuit breaker obstructing member, and an attaching member, said attaching member having a rearwardly extending portion and a forwardly extending portion, said attaching member securely attaching said obstructing member to said panelboard forward surface by the insertion of said attaching member in said first opening from said panelboard rear surface to engage said obstructing member, said rearward portion of said attaching member being disposed at said panelboard rear surface, said first opening and rearwardly portion being dimensionally related to prevent the passage of said rearwardly portion through said first opening, said forwardly portion of said attaching member projecting forward of said panelboard forward surface in alignment with a hole in said obstructing member and disposed within the volume defined by said obstructing member providing a relatively inaccessible defeater means from said forward surface, said forwardly portion being shaped to engage the cooperating recess of a special tool.

2. A circuit breaker defeater system comprising a panelboard to cooperate with a plurality of circuit breakers, a first of said circuit breakers having a higher current rating than a second of said circuit breakers, said panelboard including a forward surface and a rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening, said blocking means will prevent said first circuit breaker from being securely attached to said panelboard forward surface at a location defined by said first locating means, said blocking means including a circuit breaker obstructing member, and an attaching member, said attaching member having a rearwardly extending portion and a forwardly extending portion, said attaching member securely attaching said obstructing member to said panelboard forward surface by the insertion of said attaching member in said first opening from said panelboard rear surface to engage said obstructing member, said rearwardly portion of said attaching member being disposed at said panelboard rear surface, said first opening and rearwardly portion being dimensionally related to prevent the passage of said rearwardly portion through said first opening, said forwardly portion of said attaching member projecting forward of said panelboard forward surface and contained within the volume defined by said obstructing member to provide a relatively inaccessible defeater means from said forward surface, said forwardly portion being shaped to engage the cooperating recess of a special tool insertable through an opening in said obstructing member.

3. A circuit breaker defeater system comprising a panelboard to cooperate with a plurality of circuit breakers, a first of said circuit breakers having a higher current rating than a second of said circuit breakers, said panelboard including a forward surface and a rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening said blocking means will prevent said first circuit breaker from being securely attached to said panelboard forward surface at a location defined by said first locating means, said blocking means including a circuit breaker obstructing member, and an attaching member, said attaching member having a rearwardly extending portion and a forwardly extending portion, cooperating right hand thread means securing said attaching member to said obstructing member, said attaching member securely attaching said obstructing member to said panelboard forward surface by the insertion of said attaching member in said first opening from said panelboard rear surface to engage said obstructing member, said rearward portion of said attaching member being disposed at said panelboard rear surface, said first opening and rearwardly portion being dimensionally related to prevent the passage of said rearwardly portion through said first opening, said forwardly portion of said attaching member projecting forward of said panelboard forward surface and providing a relatively inaccessible defeater means from said forward surface, said forwardly portion being shaped to engage the cooperating recess of a special tool which must be operated to move said attaching member rearward in order to disengage said blocking means members.

4. A circuit breaker defeater system comprising a panelboard to cooperate with a plurality of circuit breakers, a first of said circuit breakers having a higher current rating than a second of said circuit breakers, said panelboard including a forward surface and rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening said blocking means will prevent said first circuit breaker from being securely attached to said panelboard forward surface at a location defined by said first locating means, said blocking means including a circuit breaker obstructing member, and an attaching member, said attaching member having a rearwardly extending portion and a forwardly extending portion, cooperating right hand thread means securing said attaching member to said obstructing member, said attaching member securely attaching said obstructing member to said panelboard forward surface by the insertion of said attaching member in said first opening from said panelboard rear surface to engage said obstructing member, said rearwardly portion of said attaching member being disposed at said panelboard rear surface, said first opening and rearwardly portion being dimensionally related to prevent the passage of said rearwardly portion through said first opening, said forwardly portion of said attaching member projecting forward of said panelboard forward surface and contained within the volume defined by said obstructing member to provide a relatively inaccessible defeater means from said forward surface, said forwardly portion being shaped to engage the cooperating recess of a special tool which must be operated to move said attaching member rearward in order to disengage said blocking means members.

5. A circuit breaker defeater system comprising a panelboard to cooperate with a plurality of circuit breakers, a first of said circuit breakers having a higher current rating than a second of said circuit breakers, said panelboard including a forward surface and a rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening said blocking means will prevent said first circuit breaker from being securely attached to said panelboard forward surface at a location defined by said first locating means, said blocking means including a triangularly shaped circuit breaker obstructing member, and a right hand threaded attaching member, the base of said triangular member having a first obstructing member opening with right hand threads to engage said attaching member, said attaching member having a rearwardly extending portion and a forwardly extending portion, said attaching member securely attaching said obstructing member to said panelboard forward surface by the insertion of said attaching member in said first opening from said panelboard rear surface to engage said first obstructing member opening, said rearwardly portion of said attaching member being disposed at said panelboard rear surface, said first opening and rearwardly portion being dimensionally related to prevent the passage of said rearwardly portion through said first opening, said forwardly portion of said attaching member projecting forward of said panelboard forward surface and providing a relatively inaccessible defeater means from said forward surface, said forwardly extending portion being unthreaded and shaped to engage the cooperating recess of a special tool, said forwardly extending portion being contained within the volume defined by said triangular obstructing member and accessible to said special tool via a second obstructing member opening in the apex of said triangular obstructing member, said second obstructing member opening being sufficient to allow the special tool to be inserted therethrough, for operation to disengage said blocking means members.

6. A circuit breaker defeater system comprising a panelboard to cooperate with a plurality of circuit breakers, a first of said circuit breakers having a higher current rating than a second of said circuit breakers, said panelboard including a forward surface and a rear surface, a bus conductor, a means for securely attaching said circuit breakers to said panelboard in front of said forward surface, and a first circuit breaker position locating means, said panelboard having a first opening therein constructed to receive a blocking means and operatively positioned with respect to said first position locating means so that when said blocking means is inserted in said first opening said blocking means will prevent said first circuit breaker from being securely attached to said panelboard forward surface at a location defined by said first locating means, said blocking means including an integrally formed triangularly shaped circuit breaker obstructing member, and a right hand threaded attaching member, the base of said triangular member comprising a first and a second layer in adjacent and parallel relationship to each other, said first layer having a first obstructing member opening threaded to engage said attaching member, said attaching member having a rearwardly extending portion and a forwardly extending portion, said attaching member securely attaching said obstructing member to said panelboard forward surface by the insertion of said attaching member in said first opening from said panelboard rear surface to engage said first obstructing member opening, said rearwardly portion of said attaching member being disposed at said panelboard rear surface, said first opening and rearwardly portion being dimensionally related to prevent the passage of said rearwardly portion through said first opening, said forwardly portion of said attaching member being disposed at said panelboard forward surface and providing a relatively inaccessible defeater means from said forward surface, said forwardly extending portion being unthreaded and generally rectangularly shaped to engage the cooperating recess of a special tool, said forwardly extending portion being contained within volume defined by said triangular obstructing member and accessible to said special tool via a second obstructing member opening in the apex of said triangular obstructing member, said second obstructing member opening being sufficient to allow the special tool to be inserted therethrough for operation to disengage said blocking means members, said second layer having a third obstructing member opening dimensionally related to said attaching member forwardly portion to permit the passage of said forwardly portion therethrough, said first, second and third obstructing member openings being in axial alignment.

11
7. A circuit breaker defeater system comprising a panelboard to cooperate with a plurality of circuit breakers, a first of said circuit breakers having a higher current rating than a second of said circuit breakers, said panelboard including a base plate having a forward surface and a rear surface, a bus conductor and a mounting member for securely attaching said circuit breakers to said base plate forward surface, said mounting member being secured to said base plate forward surface and having a first circuit breakers position locating means, said base plate having a first opening therein constructed to receive a blocking means and operatively positioned with respect to said first position locating means so that when said blocking means is inserted in said first opening said blocking means will prevent said first circuit breaker from being securely attached to said base plate forward surface at a position defined by said first locating means, said blocking means including a circuit breaker obstructing member and an attaching member, said attaching member having a rearwardly extending portion and a forwardly extending portion, said attaching member securely attaching said obstructing member to said base plate forward surface by the insertion of said attaching member in said first opening from the base plate rear surface to engage said obstructing means, said rearwardly portion of said attaching member being disposed at said base plate rear surface, said first opening and said rearwardly portion being dimensionally related to prevent the passage of said rearwardly portion through said first opening, said forwardly portion of said attaching member projecting forward of said panelboard forward surface in alignment with a hole in said obstructing member and disposed within the volume defined by said obstructing member providing a relatively inaccessible defeater means from said forward surface, said forwardly portion being shaped to engage the cooperatively shaped recess of a special tool.

8. A circuit breaker defeater system comprising a panelboard to cooperate with a plurality of circuit breakers, a first of said circuit breakers having a higher current rating than a second of said circuit breakers, said panelboard including a base plate having a forward surface and a rear surface, a first and a second bus conductor, said buses being secured to said base plate and insulated from each other, and a mounting member for securely attaching said circuit breakers to said base plate in front of said forward surface, said mounting member being secured to said base plate forward surface and positioned between said buses, said mounting member having a first circuit breaker position locating means, said base plate having a first opening therein constructed to receive a blocking means and operatively positioned with respect to said first position locating means so that when said blocking means is inserted in said first opening said blocking means will prevent said first circuit breaker from being securely attached to said base plate forward surface at a position defined by said first locating means, said blocking means including a circuit breaker obstructing member and an attaching member, said attaching member having a rearwardly extending portion and a forwardly extending portion, cooperating right hand thread means securing said attaching member to said obstructing member, said attaching member securely attaching said obstructing member to said base plate forward surface by the insertion of said attaching member in said first opening from the base plate rear surface to engage said obstructing member, said rearwardly portion of said attaching member projecting forward of said base plate rear surface, said first opening and rearwardly portion being dimensionally related to prevent the passage of said rearwardly portion through said first opening, said forwardly portion of said attaching member being disposed at said panelboard forward surface and contained within the volume defined by said obstructing member, said forwardly extending portion providing a relatively inaccessible defeater means from said forward surface, said forwardly portion being shaped to engage the cooperatively shaped recess of a special tool which must be operated to move said attaching member rearward in order to disengage said blocking means members.

9. In a circuit breaker defeater system, the combination comprising a base member having an opening therethrough, said base member having a forward surface and a rear surface, a removable member to be attached to said forward surface, and an attaching member for securably attaching said removable member to said forward surface, said attaching member being inserted through said base member opening and a cooperating opening of said removable member from said rear base member surface to engage said removable member, said inserted attaching member having a rearwardly projection disposed at said base member rear surface, and dimensionally related to said base member opening to prevent its passage therethrough, and a forwardly projection projecting forward of said forward base member surface, in alignment with a hole in said obstructing member and disposed within the volume defined by said obstructing member with the most forwardly extending portion of said forwardly projection being shaped to engage a cooperatively shaped recess of a special tool to provide a relatively inaccessible means for removing said removable member from said front surface.

10. In a circuit breaker defeater system, the combination comprising a base member having an opening therethrough, said base member having a forward surface and a rear surface, a removable member to be attached to said forward surface, and an attaching member for securably attaching said removable member to said forward surface, said attaching member having right hand thread means inserted through said base member opening and a cooperating opening of said removable member from said rear base member surface to engage cooperating thread means of said removable member; said inserted attaching member having a rearwardly projection disposed at said base member rear surface, and dimensionally related to said base member opening to prevent its passage therethrough, and a forwardly projection projecting forward of said forward base member surface contained within the volume defined by said obstructing member, the most forwardly extending portion of said forwardly projection being shaped to engage a cooperatively shaped recess of a special tool insertable through an opening in said removable member to provide a relatively inaccessible means for removing said removable member from said front surface.

11. In a circuit breaker defeater system, the combination comprising a base member having an opening therethrough, said base member having a forward surface and a rear surface, an integrally formed triangular removable member to be attached to said forward surface and a threaded attaching member for securely attaching said removable member to said forward surface, the base of said triangular member comprising a first and a second layer in adjacent and parallel relationship to each other, said first layer having a first removable member opening threaded to engage said attaching member, said attaching member being inserted through said base member opening to engage said first removable member opening, said inserted attaching member having a rearwardly projection disposed at said base member rear surface, and dimensionally related to said base member opening to prevent its passage therethrough, and a forwardly projection disposed at said forward base member surface, the most forwardly extending portion of said forwardly projection being unthreaded and generally rectangularly shaped to engage a cooperatively shaped recess of a special tool to provide a relatively inaccessible means for removing said removable member from said front surface, said forwardly projection being contained within the volume defined by said triangular removable member and accessible to said special tool via a second removable member opening in the apex of said triangular removable member, said second removable member opening being sufficient to allow the special tool to be inserted therethrough, said special tool being rotated in a clockwise direction to disengage said removable and attaching members, said second layer having a third removable member opening dimensionally related to said attaching member forwardly projection to permit the passage of said forwardly portion therethrough, said first, second and third removable member openings being in axial alignment.

12. In a circuit breaker defeater system containing a circuit breaker obstructing member, an obstructing member attaching and defeater means comprising a screw having a rear shoulder, a threaded shaft forward of said rear shoulder and an unthreaded portion forward of said threaded shaft, said rear shoulder having a screwdriver engageable recess, said unthreaded portion being generally rectangularly shaped to be insertable in a cooperative generally rectangularly shaped recess of a special tool, said special tool including an elongated rod having a lower end and an upper end, said lower end containing said generally rectangularly shaped recess, and said upper end being attached to a handle, said handle being electrically insulated from said recess.

13. In a circuit breaker defeater system containing a circuit breaker obstructing member, an obstructing member attaching and defeater means comprising a screw having a rear shoulder, a threaded shaft forward of said rear shoulder and an unthreaded portion forward of said threaded shaft, said rear shoulder having a screwdriver engageable recess, said unthreaded portion being generally rectangularly shaped to be insertable in a cooperative generally rectangularly shaped recess of a special tool, said special tool being formed of an integral metallic member of uniform circular cross section, said integral metallic member consisting of an elongated rod and a short rod, said rods being joined by a right angle bend, said elongated rod having said generally rectangularly shaped recess at its free end, said short member serving as the tool handle, said handle being electrically insulated from said recess.

References Cited in the file of this patent
UNITED STATES PATENTS
2,910,630   Hommerly _____ Oct. 27, 1959